Patented Dec. 29, 1931

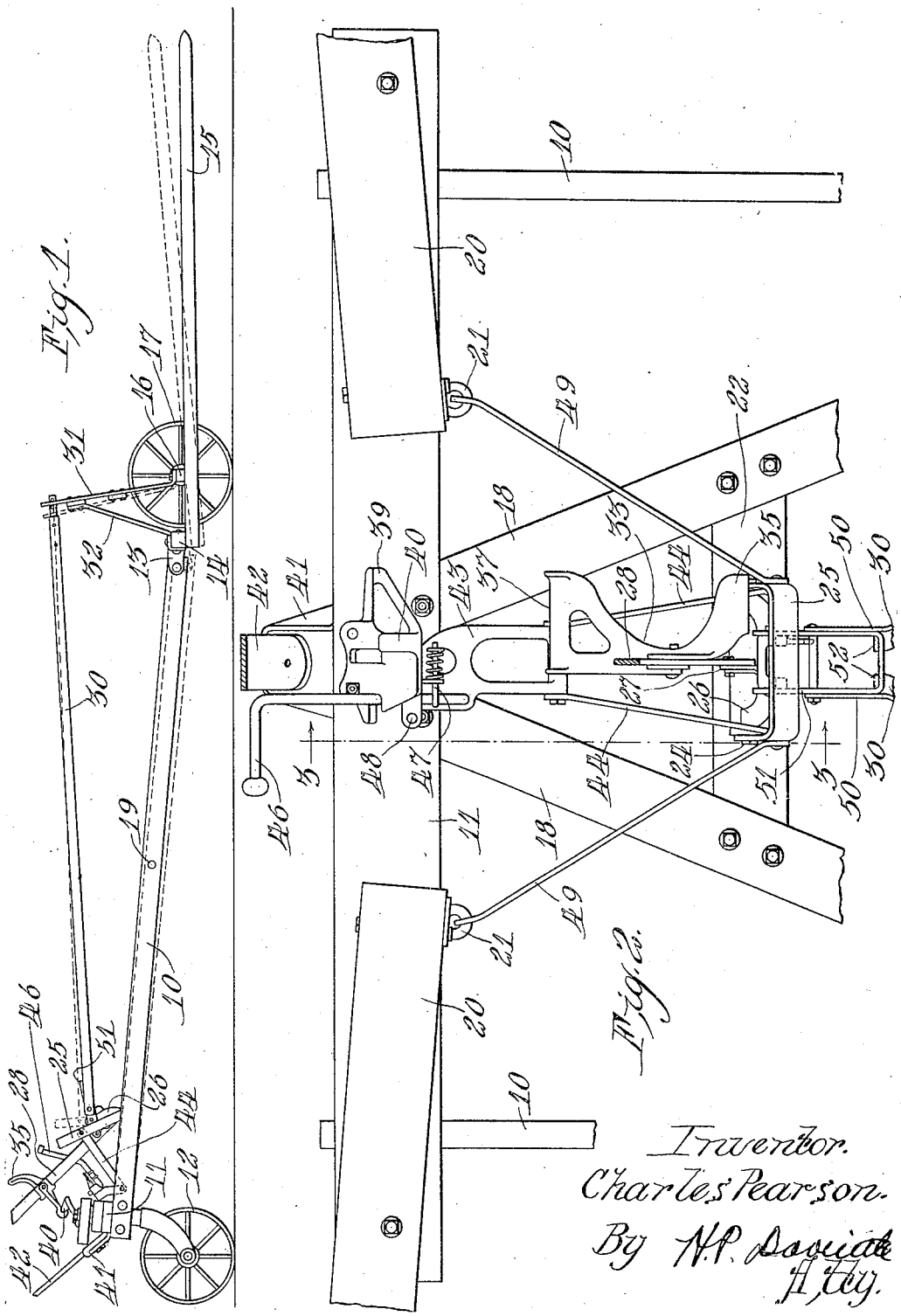

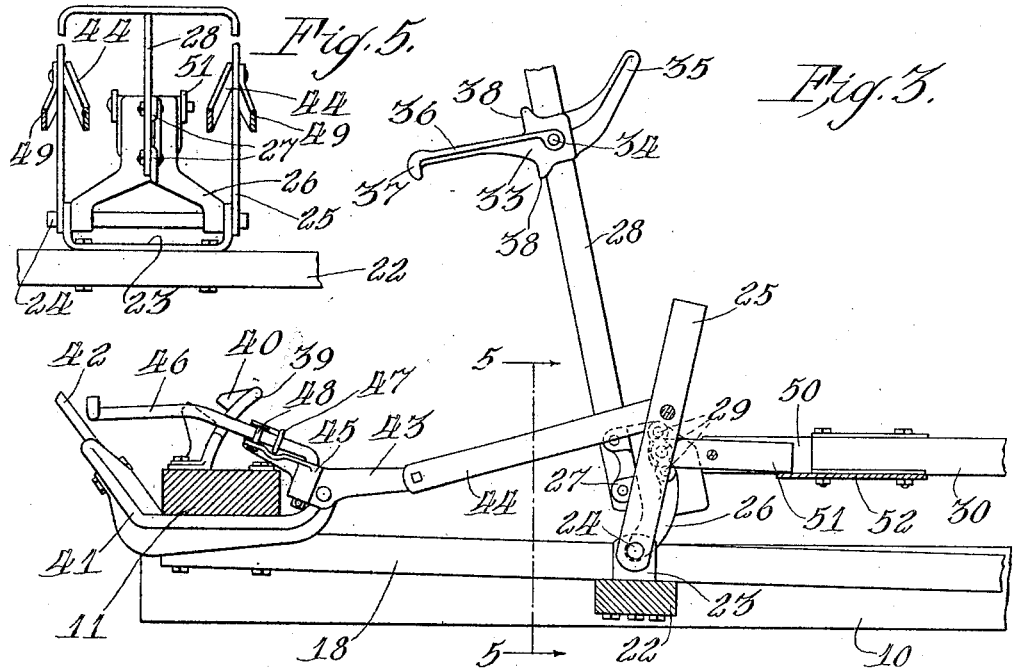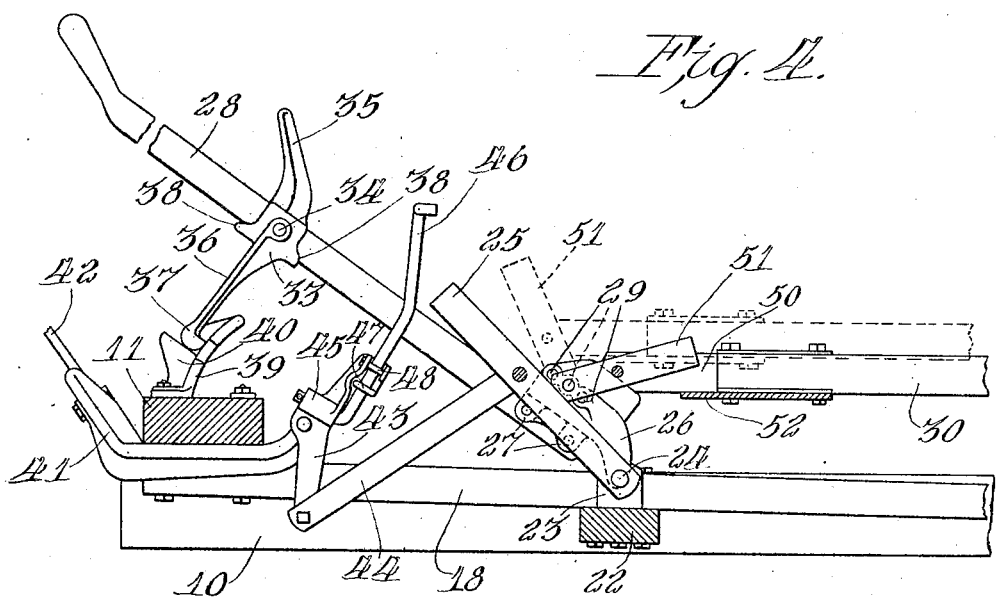

1,838,441

UNITED STATES PATENT OFFICE

CHARLES PEARSON, OF CHICAGO, ILLINOIS, ASSIGNOR TO INTERNATIONAL HARVESTER COMPANY, A CORPORATION OF NEW JERSEY

SWEEP RAKE

Application filed February 18, 1929. Serial No. 340,666.

The present invention relates to hay harvesting machines and especially to a machine of the sweep rake type used for sweeping or gathering windrows or cocks of hay in a field and transporting the load to a barn, or to a stacking machine, for building the hay into a storage stack.

The particular type of machine involved is shown in my prior Patent Number 1,695,504 of December 18, 1928, to which reference should be made.

Briefly, such machine comprises a wheel mounted frame, carrying a pivoted raking platform and a freely movable hand lever for adjusting the platform to raised position as when the machine is used for transporting a load, or for permitting the rake platform yieldingly to contact the ground as when gathering the load. For the purpose of assisting the hand lever, an assisting means comprising either a foot lever mechanism or a draft power operated mechanism is provided for aiding the hand lever in adjusting the rake platform to raised position when carrying a load. When the rake platform is adjusted to its raised position, the hand lever has moved to its rearward limit of movement and, by means of a latch mechanism, is positively locked in position to retain the platform raised.

With this machine, shown in the patent heretofore mentioned it has been found that the necessary yielding movement for the rake head or platform existed when in the raking or gathering position. However when the platform was locked in raised position for transport, the lever control mechanism was also positively locked and as a result, breakage of the platform teeth sometimes occurred when, for example, the platform moved over a large bunch of hay, or when crossing an embankment, because it could not yield or float above this locked position.

Thus, it is highly desirable to provide further structure, which will permit the lock lever controls to remain positively locked, and at the same time allow for an additional raise of the platform during transport, so that the same may yieldingly pass over large bunches of hay or embankments. In the hay gathering position of the platform, such additional structure should be inoperative.

Accordingly, it is the main object of this invention to improve the structure and operation of the sweep rake of my aforementioned patent.

Another object is to provide mechanism which will be self-acting as the rake platform, during load transport, encounters bunches of hay or embankments to cause an additional upward tilt or yield of the rake head to prevent its breakage, even though the lever which keeps the platform in its up position is positively locked.

Other objects should be apparent to those skilled in this art as the disclosure continues.

In the accompanying drawings an illustrative embodiment of the invention is disclosed, like characters of reference denoting like parts throughout.

Figure 1 is a side elevational view of a hay rake of the type described showing in full lines the machine as adjusted for transporting a load and, in dotted lines, the position of the parts when additional upward yield takes place;

Figure 2 is an enlarged, fragmentary plan view of the rear part of the machine illustrating the adjusting mechanism and the yielding feature of this invention;

Figure 3 is a side elevational view of the lever mechanism taken along the line 3—3 of Figure 2 and looking in the direction of the arrows. This figure illustrates the position of the parts when the hand lever is free to oscillate with the rake platform floatingly contacting the ground in its gathering position;

Figure 4 is a similar view, but showing the parts in the position of adjustment when the rake platform is raised for transporting a load, the additional yield being indicated in the dotted lines; and Figure 5 is a sectional view of the mechanism taken along the line 5—5 of Figure 3 and looking in the direction of the arrows.

The frame structure of the implement is standard in this art, and, as shown in the drawings, comprises a pair of longitudinally extending side frame members 10, a rearwardly disposed and transversely extending cross frame member 11, these members comprising the main frame of the implement which is carried at its rear end on a pair of spaced, trailing caster wheels 12, only one of them being shown.

The front ends of the bars 10 pivotally carry brackets 13 and support the rear crossbar 14 of the rake platform made up of a plurality of longitudinally and forwardly extending, spaced tines 15 additionally strengthened and tied together by another laterally extending crossbar 16 supported on the usual front pair of spaced wheels 17 (only one being shown) enabling the rake platform to pivot about this wheel. As shown, the main frame is further strengthened by a pair of forwardly extending, diverging bars 18 connected at their rear ends by suitable bolts to the cross frame member 11 and, at their forward ends, they are securely bolted to the side frame members 10 by bolts 19. Upon opposite sides of the longitudinal, median line of the machine is a pair of pivotally mounted draft bars 20, the inner ends thereof being provided with eye bolts 21 for a purpose to be hereinafter described, and the outer ends being provided with a conventional means for attaching singletrees for harnessing a draft animal to each side of the machine. This singletree structure has not been illustrated, as it is well known in this art.

The mechanism for effecting adjustment of the rake platform will now be described. Adjacent the rear crossbar 11 and slightly forwardly thereof, the frame members 18 carry a crosspiece 22. This crosspiece 22 has securely arranged thereon a cleat-like member 23 having upstanding ears which are apertured to receive pintles 24 upon which is pivotally mounted a U-shaped or bail member 25. Mounted between the leg portions of this bail on the pintles 24 is a pivoted, hand lever bracket 26 provided with a pair of spaced bosses 27 at its rear side, to which is securely bolted a hand lever 28. The upper forward side of the hand lever bracket has a plurality of spaced apertures 29 for adjustably mounting a pair of adjusting members 30 in accordance with the invention as later appears, said members extending forwardly and being connected to the usual upwardly extending head members 31 of the rake platform. This rake platform part 31 is suitably braced by braces 32 connected to it and to the crossbar 14. The lever 28 is not locked normally, but has a free pivotal movement on the pintles 24, such movement resulting during the gathering operation from the free up and down movement of the rake tines 15 traveling over and yieldingly conforming with the contour of the ground.

Pivoted for a limited pivotal movement on the hand lever 28 and in a position thereon accessible by the operator's foot is a gravity actuable pawl 33 pivoted on a pin or bolt 34, which includes a forwardly and upwardly extending foot trip portion 35, a rearwardly extending foot treadle portion 36, and a latch hook 37. The movement of this member on the hand lever is limited by stops 38. The purpose of this pawl member 33 will later be described.

Of course, there must be some limit of free movement to the hand lever 28 in a forward direction for regulating the floating action of the rake teeth and dropping thereof into hollows when raking a load. This dropping movement and forward swinging of the lever is limited by the bight of the bail 25. The rear crossbar 11 carries a locking or latch plate 39. A top 40, Figure 4, on this plate limits the rearward swinging movement of the hand lever 28 and upward float of the platform, because in its rearward position of swinging movement the pawl hook 37 will engage over the member 40 and lock therewith. It can now be seen that the angular distance between the stop 40 and the bail 25 determines the amount of floating movement which the lever and platform have when the rake head is gathering the load. In this rearward locked position of the hand lever the parts are set to retain the rake platform with its load in elevated position for transport to the stacking machine or bar. As the latch 37 positively has locked the hand lever 28 against swinging movement in the elevated position of the rake head or platform for transport, it is apparent during such transport, if the platform should encounter a large bunch of hay or an embankment in the field, that breakage to the platform or its parts is quite likely to occur because it cannot float or yield to prevent such breakage. The present invention provides further structure to allow the raking platform to float slightly under such circumstances, as will later appear.

But, to digress a moment before considering this feature, it will be apreciated that the hand lever 28, by itself, might not efficiently enable the operator to raise the platform if heavily loaded, and thus it is desirable that some means be provided for assisting the hand lever, thereby materially reducing the expenditure of physical effort on the part of the operator and so increasing the ease in the operation of the machine. This takes the disclosure back to the bail 25, which also serves this assisting purpose, as will now be described.

In the normal gathering operation, as shown in Figure 3, the bail 25 is spaced an angular distance from the hand lever 28. By moving it rearwardly to abut and engage the hand lever 28, it can be made to assist in moving the lever 28 rearwardly for raising the platform and load. For this purpose, a foot lever controlled mechanism is provided. A seat bracket 41 carrying the usual seat spring 42 for the seat of the operator, not shown, is bolted to the under side of the crossbar 11 between said bar and the frame members 18. The forward end of this bracket is curved upwardly and has pivotally connected thereto a foot lever bracket 43 having an end extending forwardly of its pivotal connection to the bracket 41 and having another end extending rearwardly of this pivotal point. The forward arm of the foot lever bracket has pivotally connected thereto a pair of links 44 which are pivotally connected at their other ends to an intermediate point on the legs of the bail 25, as shown. A socket 45 is integrally formed in the foot lever bracket casting adjacent and rearwardly of its pivot to the seat bracket. This socket receives the angularly bent extension of a foot lever 46. The socket permits, as will be understood, a lateral swinging movement for the foot lever which may be locked in a side marginal slot in the locking or latch plate 39. When the foot lever is in locked position it is normally held there by means of a spring-urged eye bolt 47 encircling the lever. By means of a pin 48 disposed in ears extending laterally from the rear arm of the foot lever bracket, the outer or lateral movement of the foot lever is limited.

From this construction it will be appreciated that the bail 25, which may be called a hand lever assisting means, is connected to the foot lever mechanism for operating it by the toggle connection just described. There is thus provided a foot operable mechanism for assisting a hand operable mechanism, the two utilizing the force exerted by the operator to effect raising the load. Thus, the operator seated on his seat, by pulling rearwardly on the hand lever to raise the load, would, as part of this operation, naturally brace his foot to exert a maximum pulling effort with his arms. Instead of providing a foot rest so that the operator might brace himself, the foot lever serves this purpose, it absorbing or taking up the force exerted by foot pressure to move the foot lever forwardly as the hand lever moves rearwardly.

The operator, however, by the mechanism shown, need not even exert this much physical effort in adjusting the rake to raised position when loaded, for he may bring to his assistance the draft effort of the pulling animals. Attention is again directed to the bail member 25, which has been termed the lever assisting means or member. This bail, as shown in Figure 2, has the outer sides of its legs connected by draft links 49 pivoted thereto to the eye bolts 21 disposed at the inner ends of the pivotally mounted draft bars 20. Thus, when the operator desires to adjust the rake with a minimum of effort, he moves the foot lever 46 laterally out of its locking slot in the latch plate to release the bail 25, whereupon a forward pull by the draft animals moves the inner ends of the bars 20 rearwardly to pull on the draft links 49 for moving the bail 25 to contact and push the hand lever 28 rearwardly. Thus, the hand effort, foot effort and draft effort may all be combined simultaneously to effect an easy adjustment of the rake platform when heavily loaded.

The rear ends of the adjusting members 30 are not directly connected to the movable bracket 26. The members 30 carry side angle bars 50 which are pivoted intermediately of the legs of a U-member 51, the U-member, in turn, having its legs pivoted to the bracket 26. A rest 52 is included in the bars 50. This connection forms a toggle linkage for mounting the arms 30 on the bracket 26. In the position of the parts shown in Figure 3 with the rake platform in gathering position, the toggle 50, 51 is in below dead center position against the stop 52, and, as a result, the said toggle forms a rigid connection for the arms 30 to the bracket 26. However, in the locked position of the platform, as shown in Figure 4, as when transporting the load, the breaking point of this toggle has elevated above dead center, as the bracket 26 necessarily had to be swung back to raise the load. This happens because, as the bracket 26 pivots back with the lever 28, the projection on the front part of said bracket 26 engages the forward pivot pin of the toggle 50, 51 and thereby exerts a force to throw the toggle over dead center. Should the platform now encounter a large bunch of hay or an embankment, the toggle 50, 51 is free to float to cause the platform in turn to yield and float over the obstruction to prevent its breakage.

The operation of the machine should now be understood, as it has been described in connection with the description of the construction of the machine, and it is not thought necessary further to describe this matter.

It should also be understood that when the platform is in raised position the hook 37 of the gravity pawl is locked at 40 on the latch plate. With the parts in such locked position and after the load has been taken up by the stacking machine, the platform may be returned to ground contacting position by kicking the foot trip 35 formed on the pawl, which will release the hook from the latch plate. The parts before releasing the hook from the latch are as shown in Figure 4, and, if it is difficult to effect this release, because of the inertia of the parts, it may be easily displaced by exerting a slight pressure on the foot lever 46, which, through the toggle connection 43, 44, moves the bail 25 to move the lever 28 rearwardly, thereby loosening the hook on the pawl to such an extent that a slight kick on the trip part will quickly release it.

The foot treadle 36 is useful when gathering a load, for, by pressing against said foot treadle, the hand lever 28 can be moved forwardly a little so that the adjusting members 30 push on the head 31 to make the rake tines 15 more aggressively contact the ground to make a clean job of gathering and raking.

The toggle 50, 51 provides the necessary additional yield to cause the rake platform to yield over field obstructions when the platform is raised above the ground during transportation of a load. This toggle is ineffective when the platform is in raking position.

All of the objects of the invention have thus been achieved, and, while there has been shown the preferred form of the invention, it will, of course, be understood that the same is capable of modification by a skilled workman without departing from the spirit of this invention as claimed hereinafter.

What is claimed is:

1. In a hay rake, the combination of a frame, a rake platform mounted thereon for up and down movement, a lever for adjusting the platform to raised position for load transport, means for locking the lever in this position, and non-resilient means independent of the lever locking means to enable the platform to float upwardly from load transport position when the same encounters an obstruction.

2. In a hay rake, the combination of a frame, a rake platform mounted thereon for up and down movement, a lever for adjusting the platform to raised position for load transport, means for locking the lever in this position, and means between the platform and lever comprising pivoted toggle links acting to cause an upward float of the platform above transport position when the same encounters an obstruction without disturbing the lever locking means.

3. In a hay rake, the combination of a frame, a rake platform pivoted thereon, a lever for adjusting the platform, a member engageable with the lever to assist it in adjusting the platform, means for locking the lever to retain the platform in adjusted position, and means comprising a toggle link between the lever and platform for automatically enabling an upward float of the platform when from its transport position the same encounters an obstruction.

4. In a hay rake, the combination of a frame, a rake platform mounted thereon for up and down movement, a lever for adjusting the platform to raised position, means for positively locking the lever to retain the platform in this position, and non-resilient means whereby the platform may float above this position when it encounters a field obstruction.

5. In a hay rake, the combination of a frame, a rake platform pivoted thereto for adjustment to raised position, a lever for making this adjustment and having a free movement whereby a floating action of the platform in lowered position may take place, means for locking the lever to maintain the platform in raised position, and means comprising a toggle link between the lever and platform whereby the platform may rise automatically above this position when it strikes an obstruction.

6. In a hay rake, the combination of a frame, a rake platform pivoted thereto for adjustment to raised position, a lever for making this adjustment and having a free movement whereby a floating action of the platform in lowered position may take place, means to lock the lever to hold the platform in its raised position, and means comprising a non-resilient connection between the lever and platform whereby an additional float of the platform may occur from its raised position.

7. In a hay rake, the combination of a frame, a rake platform pivoted thereon, a bracket pivoted on the frame and carrying a lever, means carried by the bracket for connecting the lever and platform for raising the platform, means to lock the lever and platform in raised position, and means comprising a toggle link engageable by the bracket whereby a floating movement of the platform in its raised position may occur.

8. In a hay rake, the combination of a frame, a rake platform pivoted thereto, adjusting members including a lever for tilting said platform from lowered to raised position, means whereby the platform floatingly engages the ground in the lowered position thereof, means to positively lock the adjusting lever to retain the platform in its raised position, and a toggle link between the adjusting members and lever whereby the platform may float above its normal raised position when the same encounters an obstruction.

9. In a hay rake, the combination of a frame, a rake platform pivoted thereto, a lever on the frame, adjusting members operable thereby for tilting the platform to raised position, means for locking the lever to retain the platform in such raised position, and means whereby the platform may float above its raised position when the same encounters an obstruction, said last mentioned means being ineffective when the platform is in its lowered raking position.

10. In a rake, the combination of a frame, a platform pivoted thereto, a bracket pivoted on the frame, a lever connected to and movable with the bracket, a member pivoted to the bracket, adjusting members for operating the platform, said members being pivotally connected to the member to form a toggle linkage, said toggle being automatically locked as a rigid link when the platform is on the ground in raking position, said bracket engaging the breaking point of the toggle to move it over dead center when the platform is raised, and means to lock the lever in position to hold the platform raised, said broken toggle providing a float for the platform in such raised position in the event an obstruction is encountered.

11. In a hay rake, the combination of a frame, a wheel carried rake platform pivoted to the forward end of the frame, said platform including an upwardly extended member at its rear, an adjusting member connected to the upwardly extended member, a lever for moving the adjusting member to adjust the platform to load transport position by rocking the same about the axis of its wheel support, means for positively locking the lever in such adjusted position, and means connected between the adjusting member and lever to provide a floating connection which becomes effective when the rake platform encounters an obstruction whereby said platform may float above its normal raised position to prevent damage thereto.

12. In a hay rake, the combination of a frame, a wheel carried rake platform pivoted to the forward end of the frame, said platform including an upwardly extended member at its rear, an adjusting member connected to the upwardly extended member, a lever for moving the adjusting member to adjust the platform to load transport position by rocking the same about the axis of its wheel support, means for positively locking the lever in such adjusted position, and a link pivotally connected between the adjusting member and lever to provide a floating toggle connection which becomes effective when the rake platform encounters an obstruction whereby said platform may float above its normal raised position to prevent damage thereto.

13. In a hay rake, the combination of a frame, a wheel carried rake platform pivoted to the forward end of the frame, said platform including an upwardly extended member at its rear, an adjusting member connected to the upwardly extended member, a lever for moving the adjusting member to adjust the platform to load transport position by rocking the same about the axis of its wheel support, means for positively locking the lever in such adjusted position, said lever also being movable to lower the platform to raking position, means comprising an over dead center toggle link pivotally connected between the adjusting member and lever which mechanism is inactive when the platform is in raking position, and means to make said mechanism operable when the lever is moved to locking position to provide a floating connection operable upon resistance to draft force when the rake platform encounters an obstruction whereby said platform may float above its normal raised position to prevent damage thereto.

In testimony whereof I affix my signature.

CHARLES PEARSON.